United States Patent
Hayashi et al.

[11] 3,770,386
[45] Nov. 6, 1973

[54] APPARATUS FOR PURIFYING CRYSTALS COMPRISING A STIRRER WITH FINS FORMING A DISCONTINUOUS SPIRAL

[75] Inventors: Yasuo Hayashi; Kenji Kodama; Minoru Ohta; Shigeru Saito, all of Iwaki, Japan

[73] Assignee: Kureha Kagaku Kogyo Kabushiki Kaisha, Tokyo, Japan

[22] Filed: Sept. 28, 1970

[21] Appl. No.: 76,123

Related U.S. Application Data
[63] Continuation-in-part of Ser. No. 812,703, April 2, 1969, abandoned.

[30] Foreign Application Priority Data
Apr. 2, 1968  Japan............................. 43/21566
June 25, 1968  Japan............................ 43/44020

[52] U.S. Cl..................... 23/270, 62/58, 23/273 F, 159/25 A, 62/124
[51] Int. Cl............................................. B01d 11/00
[58] Field of Search...................... 23/273 F, 273 R, 23/310, 270.5, 270; 62/58, 124; 159/25 A; 196/14.52

[56] References Cited
UNITED STATES PATENTS
| | | | |
|---|---|---|---|
| 3,402,047 | 9/1968 | Shaul | 62/58 |
| 3,652,230 | 3/1972 | Girling | 62/58 |
| 2,617,273 | 11/1952 | Findlay | 23/273 |
| 2,626,786 | 1/1953 | McGlothlin | 23/273 |
| 2,659,761 | 11/1953 | Frevel et al. | 23/273 |
| 2,679,539 | 5/1954 | McKay | 23/273 |
| 2,816,821 | 12/1957 | Weedman | 62/58 |
| 3,222,880 | 12/1965 | Findlay | 62/58 |
| 3,347,058 | 10/1967 | Svanoe | 62/58 |
| 3,357,196 | 12/1967 | Dutcher et al. | 62/58 |
| 3,529,938 | 9/1970 | Yoon et al. | 23/273 |

Primary Examiner—Norman Yudkoff
Assistant Examiner—R. T. Foster
Attorney—Sughrue, Rothwell, Mion, Zinn & Macpeak

[57] ABSTRACT

A method and apparatus for continuously purifying a crystalline substance containing an impurity having a lower melting point than that of the crystalline substance, comprising continuously purifying crystals in a purification tower, said tower being provided with a stirrer for transporting said crystals upwards in said tower while preventing the crystals from coagulating, the stirrer having fins arranged spirally along the axis thereof at an angle opposite to the direction of the spiral, melting at least a portion of the purified crystals, refluxing a portion of the melting crystals to the inside of the tower to wash the ascending impure crystals, and removing the remaining portion of the purified crystals from the tower.

10 Claims, 20 Drawing Figures

PATENTED NOV 6 1973 3,770,386

INVENTORS
YASUO HAYASHI
KENJI KODAMA
MINORU OHTA
SHIGERU SAITO

BY Sughrue, Rothwell, Mion, Zinn & Macpeak
ATTORNEYS 3,770,386

APPARATUS FOR PURIFYING CRYSTALS COMPRISING A STIRRER WITH FINS FORMING A DISCONTINUOUS SPIRAL

CROSS-REFERENCE TO RELATED APPLICATION

The present application is a continuation-in-Part of U.S. Pat. application, Ser. No. 812,703 filed Apr. 2, 1969, by the same inventors, and now abandoned.

BACKGROUND OF THE INVENTION

1. Field of the Invention

The present invention relates to a method of continuously purifying a crystalline substance containing an impurity having a lower melting point than that of the crystalline substance by utilizing as a purifying liquid a molten liquid of a component of the crystalline substance which has been purified to a purity of greater than 99.9 percent in a purification tower; the tower having at least one stirrer which transports the crude crystal upwards through the tower, while preventing the coagulation of the crystals in the tower. The present invention also relates to an apparatus for continuously purifying a molten liquid of a component of said crystalline substance purified as above, and more particularly to a stirrer apparatus to transport the crude crystals upwards through a purification tower.

2. Description of the Prior Art

Heretofore, a purification method comprising obtaining a pulsatory motion pressure by utilizing a reciprocating piston as means of transporting a crude crystal through a purification tower provided with a filtering section, a purification section and a melting section has been known (see, e.g., U.S. Pat. Nos. Re 23,810, 2,854,494, and Japanese Patent Publication No. 3884/65). However, the crystals cannot be fully transported with the pulsatory motion pressure utilizing the reciprocating piston as a means of transporting the crystal because the crystals become coagulated. Therefore, apparatus employing such a pulsatory motion pressure cannot be industrically utilized for the purification of crystals.

SUMMARY OF THE INVENTION

The method of the present invention utilizes, as a means of transporting the crystals, a stirrer devised such that the crystals can be transported while preventing their coagulation, and also the stirrer serves to promote the purification of the crystals. By employing the stirrer of the present invention, when the raw material has a high solid content (i.e., over 50 percent) a crystalline substance containing an impurity of low melting point can be continuously purified to a purity of about 99.9 percent while being transported through a purification tower without causing the coagulation of the crystals.

DETAILED DESCRIPTION OF THE INVENTION

Figure 1:
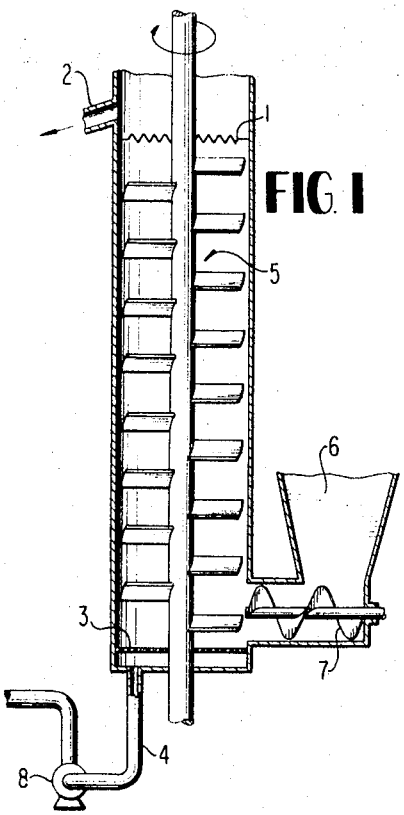
FIG. 1 shows an embodiment of the purification apparatus in accordance with the present invention.

The novel purification apparatus used for carrying out the method of the present invention is a purification tower provided with a heating and melting means 1 and a product outlet 2 in the upper portion of the cylindrical tower, a filtration means 3 and an impurity outlet 4 in the lower portion, and a stirrer 5 which transports the crystals upwards through the tower, unravels the crystals and prevents the coagulation thereof in the inside of the column, as shown in FIG. 1. By the term "unraveling" of the crystals is meant that the crystals are maintained in a dispersed state throughout the liquid present in the purification tower, with the result that the crystals do not agglomerate or coagulate. Further, since the crystals are maintained in this "unraveled" state, the purification thereof proceeds more efficiently in view of the greater contact area with the purification liquid descending downwards through the tower. This will be explained in detail hereinbelow.

Figure 2A:
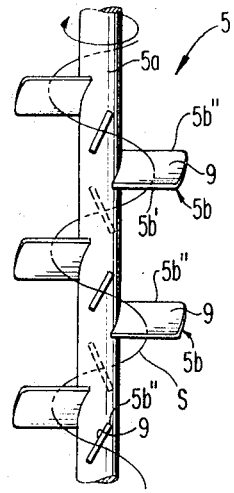
FIGS. 2 and 3 show embodiments of the stirrer of the present invention, (a) showing an elevation view, and (b) showing a plane view.
Figure 2B:
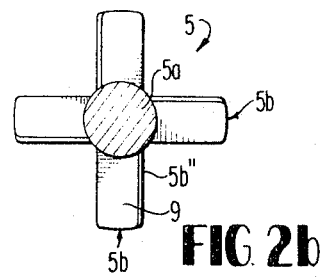

The stirrer 5 employed in the pratice of the present invention, as is shown in FIG. 2, is provided with fins 5b having a plain or curved surface facing upwards to the direction of rotation of the stirrer and arranged in a spiral row along the axis 5a of the stirrer. Each of the fins 5b (when viewed radially inward toward the supporting column) is at an angle opposite to the imaginary line S tracing the sprial direction of the fins, and one fin partly overlaps the fin adjacent thereto (when seen laterally). In other words, the leading edge 5b ' of one fin is overlapped by the trailing edge 5b " of the adjacent fin.

The use of sprial fins for transporting a substance has been known, for example, an endless scres is disclosed in U.S. Pat. No. 2,659,761 to Frevel, and two or more fins secured to a shaft at the same height are disclosed in U.S. Pat. No. 3,142,589 to Schaffer. When a substance is transported by means of sprial fins, the substance ascends on the fins while being compressed on the upper surface of the fins due to the force of rotation. At this time, there is a great deal of sparse (i.e., small solids concentration) liquid component on the rear side of the fins, and the crystals are in an unravelled state (i.e., well-dispersed). In this unravelling zone, the exchange of substances based on an equilibrium of solid liquid contact, recrystallization and washing is effected, and the purification of the crystals is carried out by a repeated solid-liquid separation in the subsequent compressing step If the fins are arranged to form an endless screw, the crystals are constantly being transported only on the conpressing sides of the fins, and are never unravelled. With fins of the partly broken-away endless screw type (fins provided at angles in the same direction as that of the spiral arrangement), the crystals ascend on one fin while being compressed, and the crystals which have reached the top end of the fin are immediately transported by the subsequent fin. Accordingly, the crystals hardly become unravelled since they are continually being transported by the fins. This is substantially the same as in the case of the endless screw.

Furthermore, crystals cannot be transported upwards by a stirrer comprising a shaft and several fins secured thereto at the same height at predetermined intervals. Accordingly, in the case of a stirrer provided with fins in such a manner, the transportation of crystals is made possible only by using a plurality of such stirrers (as in the Schaffer patent); the transportation can be effected only at the parts where the fins of one stirrer overlap those of another.

Figure 14:
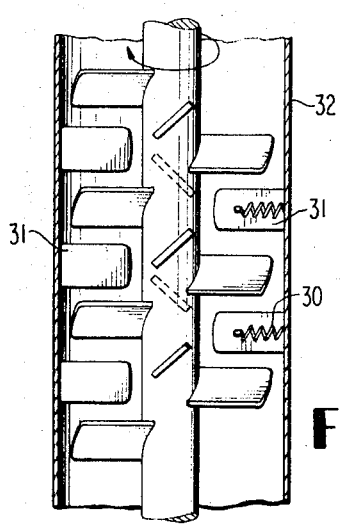
FIGS. 13 and 14 represent plane and elevational views, respectively, of yet another embodiment of the present invention.
Figure 13:
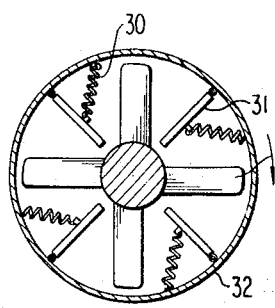
Figure 10:
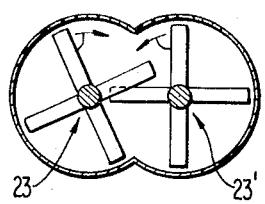
FIG. 10 is a cross-section of FIG. 8 where noted.
Figure 15:
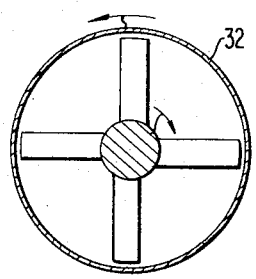
FIG. 15 is a plane view of still another embodiment of the present invention.

With the stirrer used in the present invention, the crystals are compressed against the upper surface 9 of a first fin and ascend on the fin surface while being squeezed free of the liquid component. The crystals which have reached the top end (i.e., trailing edge $5b''$) of the first fin are then conveyed to the zone on the rear side of the first fin where they are unravelled by full contact with the liquid. A second fin adapted to move the crystals in this zone further upwards is located immediately before the first fin in the direction of rotation of the stirrer, and therefore, the crystals in the unravelling zone remain untransported during the time when the stirrer rotates through approximately one revolution. Since the upper part (i.e., trailing edge $5b''$ of one fin overlaps the lower part (i.e., leading edge $5b'$) of the adjacent fin to move the crystals upwards, it is possible to transport the crystals upwards at every part of the tower by utilizing the stirrer of the present invention. In addition, since the crystals can be caused to reside for long periods of time in the unravelling zone, the purification efficiency of the apparatus of the present invention is excellent as compared with purification processes performed by using fins of the known types. The stirrer of the present invention sometimes runs idle depending upon the state of a material to be purified. This can be prevented by a) providing an interrupting plate (31) attached to tower 32 by a spring (30) as it rotates so as to be pressed by the fin of the stirrer, as shown in FIGS. 13 and 14, or b) by rotating the body of the tower (32) in a direction opposite to the direction of rotation of the stirrer as shown in FIG. 15, or c) by providing a plurality of stirrers as shown in FIGS. 10 and 11.

Incidentally, in the case of fins provided in two or more sprial rows, any crystals pushed up onto the top end of one fin and then into the unravelling zone are moved further upwards not by a fin on the same sprial row but by a fin on another spiral row located immediately behind the one fin. Hence, the crystals are forcibly transported without remaining in the unravelling zone for any significant length of time. It is absolutely necessary therefore to provide fins in one sprial row.

Figure 3A:
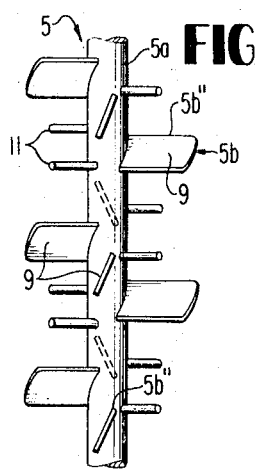
Figure 3B:
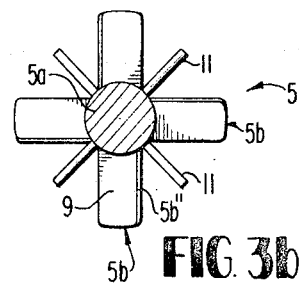

It is also possible to provide nail- or rod-like projections 11 between fins $5b$, as illustrated in FIG. 3, in order to assist in the unravelling of dispersing operation.

Various types of heating and melting means can be employed. For example, as shown in FIGS. $4a$ and $4b$, a melting tower 12 may be provided on the upper end of the purification tower the purified component ascending in the interior of the purification tower is introduced into the melting tower 12 from the upper side, and an appropriate heater 13, such as a steam pipe, etc., is provided in the lower portion of the melting tower to melt the crystal.

Figure 6:
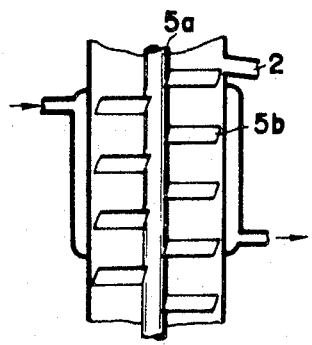

The bottom of the melting tower 12 is provided with a product outlet 2 and a reflux port 14 to provide for a return of a portion of the melted crystals back to the purification tower. A pipe 16 may be provided under the reflux port 14 and extended to the axis $5a$ of the stirrer 5, which has an appropriate number of openings 15 so as to allow the introduction of the molten reflux liquid into the inside of the purification tower as uniformly as possible. In addition, the apparatus may be provided with a plurality of steam pipes 17 (see FIGS. $5a$ and $5b$) or a steam jacket (see FIG. 6) to heat the upper portion of the purification tower.

Because of this heating, the upper part of the tower is maintained at the melting point of the crystals or at higher temperatures. The descending molten liquid component of the crystal crystallizes out *in situ* according to its concentration and the temperature while, at the same time, melting the ascending crystals being purified. The purity of the crystalline component to be purified in the tower becomes progressively higher towards the upper portion of the tower. Thus, as the crystallization of the molten crystalline component occurs, the crystallized component readily adheres to the surfaces of the fins, resulting in the loss of proper function of the fins. These adhering crystals cannot be satisfactorily melted by means of only a heating device of the type described above.

Figure 7:
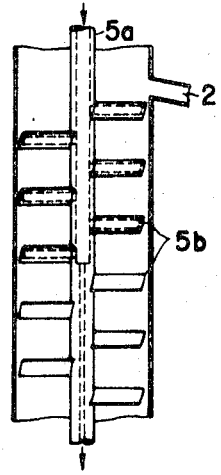
Figure 12:
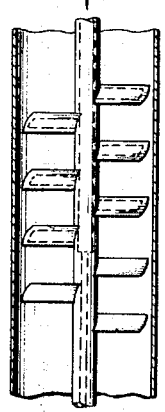
FIG. 12 is a cross-section of the stirrer used in one embodiment of the present invention.

In order to prevent such deposition of the crystals and ensure the smooth transportation and purification of the crystals, the apparatus of the present invention employs a stirrer of the type illustrated in FIGS. 7 or 12, in which a heat transfer medium is passed through the axis and fins of the stirrer, to thereby melt the crystals which tend to adhere to the axis and fins. The heating may also be effected by circulating steam or some other suitable fluid, or by disposing an electric heating means, within the stirrer. When a heating device is provided in the axis only, the temperature differs from the surface of the axis to the end portion of the fins, and the adhesion of crystals thereto sometimes cannot be sufficiently prevented at an area where the temperature is low. For melting only those crystals which adhere to the stirrer, it is also desirable to cover a portion or the entire surface of the stirrer with a material having a relatively low thermal conductivity, and one which is not corroded by the substance being purified, such as Teflon (trademark for polytetrafluoroethylene resins) and polyethylene, thereby to ensure the uniformity of the temperature of those portions of the stirrer which are at the same height within the tower.

Smooth transportation and purification of the crystals can be effected by internally heating the entire stirrer or only its upper part to which the crystals are likely to adhere as such heating prevents the precipitation or deposition of the crystals on the surface of the stirrer.

The upper portion of the inside of the tower may be maintained at the temperature of the melting point of the crystal, or above, and the lower portion may be occasionally cooled to a temperature below the melting point of the crystal by providing suitable cooling means.

The method of the present invention is to purify crystals by forcing the crude crystals or a slurry-crystal mixture by means of a stirrer upwards through the inside of the tower and contacting it with the descending molten liquid of the purified component melting in the upper portion of the tower.

The organic compounds which can be purified by the method of the present invention are exemplified by para-xylene, containing meta-xylene, ortho-xylene, ethylbenzene and toluene; and para-chlorobenzene obtained from the reaction mixture resulting from chlorinating benzene to produce para-chlorobenzene; para-dichlorobenzene, industrial salts, and the like.

The solid content of the solid-liquid mixture fed as a raw material to the purification tower is approximately 50 percent by weight, or more, preferably about 70 percent by weight, or more. However, the solid content may be less than the above percentages.

The method of the present invention will be illustrated in detail with respect to FIGS. 1 and 2 as follows:

Crude crystals or a slurry crystal mixture are charged as a raw material from the charging mouth 6 into the purification tower by means of a screw conveyor 7. The raw materials charged into the tower are purified while being transported to the upper portion of the tower by means of the stirrer 5. The heating and melting means 1 positioned in the upper portion of the tower is maintained at the temperature of the melting point of the crystal component, or above whereby the purified crystal is melted to a liquid. A portion of the liquid descends back down through the tower and contacts the raw material crystal rising in the tower.

In the purification process, the raw material crystals are pushed up by the upper surface 9 of the fin 5b by means of the above-described rotation of the stirrer 5 (axis 5a, fin 5b), unraveled by the trailing edge 5b'' or projection 11 of the fin 5b and are thereby transported upwards in the inside of tower without coagulating.

During the ascending process, when the crystals are unraveled, the steps of absorption of small crystal masses by the descending molten liquid of the purified components, washing, dissolving, and crystallizing out, corresponding to the purity and the temperature of the crystal components, are repeated, and when the crystals are pushed up, the separation of crystal and liquid by the compression of the fins is carried out. These phenomena are combined and continuously carried out and thus the raw material crystals are purified while ascending in the inside of the tower. Thus, when reaching the upper portion of the tower, the crystal components are purified to a purity of above 99.9 percent and all or a major portion of the crystals are then heated and melted. One portion of the purified material reaching this upper portion is removed by means of product outlet 2 and the remaining liquid portion is returned to the inside of the tower to provide for the purification of the ascending raw materials.

The impurities of low melting point descend down through the inside of the tower and are separated from the crystals by the filtration means 3 and removed from the tower by means of discharge outlet 4.

The inside of the purification tower is usually at a normal pressure, but occasionally may be evacuated by means of a vacuum pump 8, or alternatively, may be pressurized from the top of the tower to increase the flowing amount of liquid and thereby increase the rate of purification.

In the above-described apparatus of the present invention, where only one stirrer is provided, the crystals tend to ascend on the fins of the stirrer, as they are masses, or to adhere to the stirrer, and, therefore, occasionally are not sufficiently unraveled. In addition, in some cases, the stirrer runs idle.

Figure 11A:
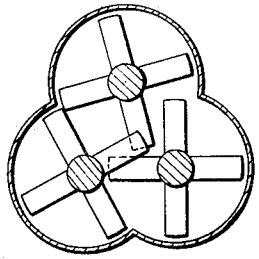
FIGS. 11(a) and (b) are cross-sections showing other embodiments of the apparatus of the present invention.
Figure 11B:
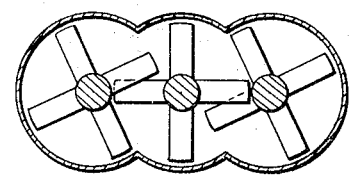

In another embodiment of the apparatus of the present invention, the purification tower combines two or more stirrers as shown in FIG. 10 and FIGS. 11(a) and (b), the fins of each stirrer coming as close to the axis of the adjacent stirrer as possible. The fins of the adjacent stirrers engage each other.

The stirrers adjacent to each other may be rotated in the same direction or in opposite directions to unravel the crystals as well as to scrape the crystals off of the other stirrers and hence the crystals can be more effectively unraveled and the purification of crystals more efficiently carried out.

Figure 8:
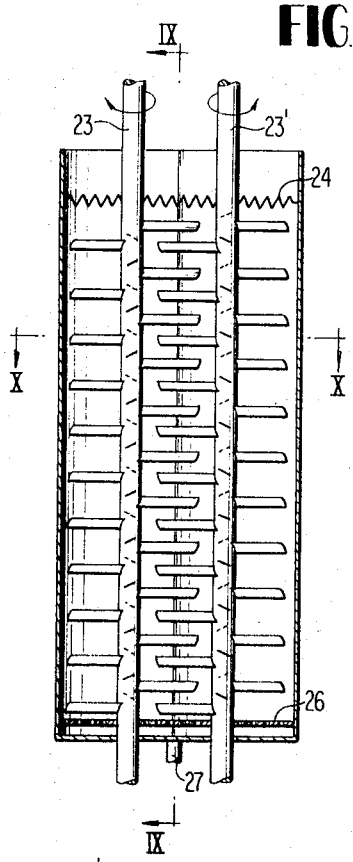
FIG. 8 shows another embodiment of the apparatus of the present invention in vertical section.
Figure 9:
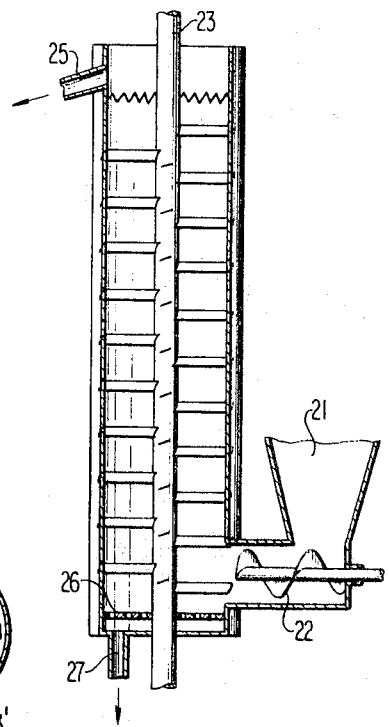
FIG. 9 is a cross-section of FIG. 8 where noted.

In the apparatus of the present invention, a means of flowing the solvent downward may be provided in place of the heating and melting means 24 shown in FIGS. 8 and 9 and the crystals can be purified using the solvent as a washing liquid.

The apparatus of the present invention wherein two stirrers are combined will be illustrated by referring to the drawings. The form of the purification tower is a gourd-shaped cylinder in its cross-section as shown in FIG. 10, with stirrers 23 and 23' in each side, respectively. To illustrate more precisely, as shown in FIGS. 8 and 9, the purification tower is provided with heating and melting means 24 or means of flowing the solvent downward, port 25 for taking out the purified product in the upper portion of the tower, filtration means 26, port 27 for taking out the impurities, and stirrers 23 and 23' to push up and transport the crystals through the tower, while at the same time unraveling the crystals. The fins of the stirrers are provided sprially in a direction opposite to the direction of rotation of the stirrer and the fins themselves are a flat or curved plane facing upwards to the direction of rotation of the stirrer. In case the adhesion of crystals to the fins cannot be prevented by scraping the fins, a heating medium may be occasionally passed through the fins to melt and remove the crystals tending to adhere to the fins as shown in FIG. 12.

The combined stirrers in the present invention are disposed in such a manner that the fins of one stirrer are located between the fins of the stirrer adjacent thereto and the fins engage each other in the position between the stirrers. The effect of unraveling the crystals is increased by rotating the combined stirrers in the same or opposite directions and thereby the crystals can be unraveled and transported upwards in the inside of the tower while preventing the crystals from forming clumps adhering to the fins of the stirrer.

The purification process utilizing the apparatus of the present invention will be illustrated in the case wherein the molten liquid of the crystals as purified will be utilized as a washing liquid. As described above, the crystals which are transported upwards in the inside of the tower are, due to the heating and melting means, maintained at a temperature of their melting point, or above. Subsequently, part of the crystals are melted to a liquid which falls down in the inside of the tower to provide for the purification of raw material crystals which are being transported upwards therein.

That is, the unraveled crystals are repeatedly and continuously adsorbed by the molten liquid of the descending purified component, washed and dissolved, and crystallized out, corresponding to the purity and temperature of the crystal component at that time, and thus, the raw material crystals are purified while ascending in the inside of tower. Thus, when the crystals reach the upper portion of the tower, the crystal component is purified to a substance having a purity of above 99.9 percent and then at least a portion thereof is melted by heating. A part of the purified materials which reach the upper portion of the tower is taken out as a product, and the remaining part is returned to the inside of the tower in order to purify the raw material crystals being pushed up through the tower.

The impurities contained in the raw material crystals descend through the inside of the tower, are separated by means of the filtration means and removed from the tower through the discharge port 27.

The present invention will be illustrated further by the following examples which are not intended to limit the scope of the invention in any manner.

EXAMPLE 1

Figure 4A:
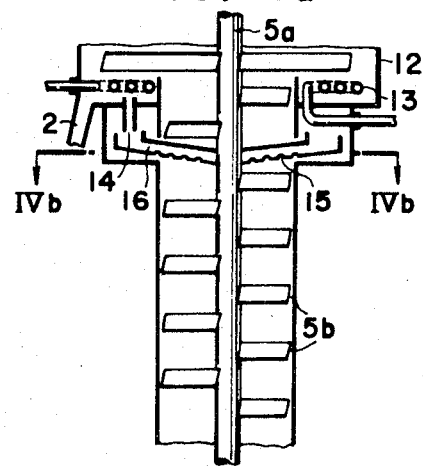
FIGS. 4(a), 5(a), 6 and 7 are elevations in cross-section showing embodiments of the heating and melting means.
Figure 4B:
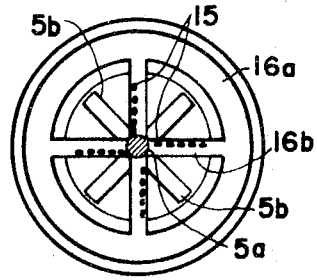
FIG. 4(b) is a cross-section of FIG. 4(a) where noted.
Figure 5A:
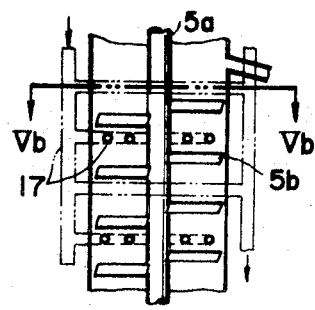
Figure 5B:
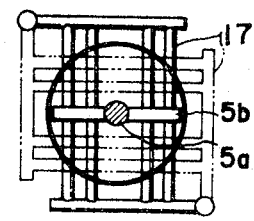
FIG. 5 (b) is a cross-section of FIG. 5(a) where noted.

To a purification tower comprising a metallic cylinder 1,000 mm in length and 155 mm in inner diameter provided with the stirrer shown in FIG. 2, the heating and melting means as shown in FIGS. 4 and 7, and whose temperature was controlled to from 53° to 54°C in the upper portion of the tower and to room temperature in the bottom, crystals of crude para-dichlorobenzene comprising 0.3 percent monohlorobenzene, 94.5 percent para-dichlorobenzene, 4.9 percent ortho-dichlorobenzene and 0.3 percent trichlorobenzene were charged at the rate of 40 Kg/hr., and para-dichlorobenzene having a purity of 99.9 percent was obtained at the rate of 35.4 Kg/hr., the purity being determined by gas chromatographic analysis.

EXAMPLE 2

Using the same apparatus as in Example 1 and the same temperature conditions, a slurry mixture of 65.2 percent paradichlorobenzene, 33.0 percent ortho-dichlorobenzene and 0.3 percent trichlorobenzene was charged to the tower at the rate of 123 Kg/hr and para-dichlorobenzene having a purity of 99.9 percent, determined by gas chromatographic analysis, was obtained at the rate of 35.6 Kg/hr.

EXAMPLE 3

To the same apparatus as in Example 1, the temperature of which was controlled to from 13° to 14°C in the upper end and cooled to −20°C in the lower end by means of an appropriate method, crude para-xylene having the composition of 65.3 percent para-xylene, 19.8 percent meta-xylene, 9.7 percent ortho-xylene and 5.2 percent ethylbenzene was charged at the rate of 83 Kg/hr and para-xylene having a purity of 99.9 percent, determined by gas chromatographic analysis, was obtained at the rate of 34.2 Kg/hr.

EXAMPLE 4

To a purification tower comprising a metallic cylinder 1,000 mm in length and having a gourd-shaped cross-section (having two circles 250 mm in diameter, the distance between their centers being 150 mm) provided with heating and melting means and two stirrers rotating in opposite directions, the temperature of which was controlled to form 53° to 54°C in the upper end of the tower and to room temperature in the lower end, crystals of crude para-dichlorobenzene of 0.3 percent mono-chlorobenzene, 94.5 percent para-dichlorobenzene, 4.9 percent ortho-dichlorobenzene and 0.3 percent trichlorobenzene were charged at the rate of 160 Kg/hr to obtain para-dichlorobenzene having a purity of 99.9 percent at the rate of 141 Kg/hr. The analytical values of raw materials and products were obtained employing gas chromatographic anaylsis.

EXAMPLE 5

Using the same apparatus and the same temperature conditions as in Example 4, slurry mixture of 65.2 percent para-dichlorobenzene, 34.5 percent ortho-dichlorobenzene and 0.3 percent trichlorobenzene was charged thereto at the rate of 592 Kg/hr to ottain para-dichlorobenzene having a purity of 99.9 percent at the rate of 142 Kg/hr.

EXAMPLE 6

To the same apparatus as in Example 4, the temperature of which was controlled to from 13° to 14°C in the upper end and cooled to −20°C in the lower end by an appropriate method, crude para-xylene having a composition of 65.3 percent para-xylene, 19.8 percent meta-xylene, 9.7 percent ortho-xylene, and 5.2 percent ethylbenzene was charged at the rate of 320 Kg/hr to obtain para-xylene having a purity of 99.9 percent at the rate of 137 Kg/hr.

EXAMPLE 7

To a purification tower comprising a metallic cylinder of 1,000 mm in length and having a gourd-shaped cross-section (having two circles of 250 mm in diameter, the distance between their centers being 150 mm) and which was provided with means for providing a downward-flowing washing liquid in the upper portion and two stirrers rotating in opposite directions inside the tower, an industrial salt containing 1.0 percent MgO and 10 percent water was charged to the bottom portion at the rate of 2 ton/hr and a saturated aqueous solution of table salt was flowed down a the washing liquid from the upper portion. A washed salt containing 11 percent water and 0.07 percent MgO was obtained at the rate of 1960 Kg/hr by the concurrent washing.

I claim:

1. A stirrer-equipped apparatus for purifying a crystalline substance containing impurities having a lower melting point than that of the final product comprising
   a. a purification tower,
   b. means at the lower portion of said purification tower for charging impurity-containing crystals into said tower,
   c. heating means at the upper portion of said tower for melting at least a portion of the resulting purified crystals,
   d. means for returning at least a portion of the melted purified crystals to the upper portion of the inside of said tower,
   e. means for withdrawing that portion of the molten purified crystals not returned to the inside of said tower out of said tower, and
   f. stirrer means for transporting said impurity-containing crystals upwards from the lower portion of said tower to the upper portion of said tower, said stirrer means comprising a centrally-located rotatable axis having a plurality of fins secured to and projecting outwardly from said axis, said fins being arranged along said axis forming a discontinuous spiral around said axis, each of said fins being pitched at an angle opposite to the direction of the sprial, wherein the upper portion of each fin overlaps the lower portion of the next vertically adjacent fin proceeding upwardly in the direction of the sprial, said stirrer being provided with heating means within said axis and each of said fins in order to prevent the deposition of said impurity-containing crystals on said axis or fins.

2. An apparatus for purifying crystals as in claim 1, wherein at least a portion of the surface of said stirrer means is covered with a material having a low thermal conductivity to thereby insure that the surface temperature of that portion of said stirrer means which is at the same height within said tower is at a uniform temperature.

3. An apparatus as in claim 1 wherein said fins are curved, solid, non-porous members fixedly attached to said axis, wherein the concave face of the curved fins faces upwardly in said tower.

4. An apparatus for purifying crystals as in claim 1, wherein said stirrer means comprises at least two centrally located axes, each of said axes having spirally located fins attached radially thereto wherein the fins of each of said axes engage the fins attached to the other of said axes in a position between said axes, and wherein said axes are separated from each other by a distance just exceeding the length of the fins attached to each of said axes.

5. An apparatus for purifying crystals as in claim 4, wherein each of said axes additionally has attached thereto in a radial direction rod-like members of a length shorter than the length of said fins attached to said axes.

6. An apparatus for purifying crystals as in claim 4, wherein said axes are disposed in a straight line.

7. An apparatus for purifying crystals as in claim 4, wherein said axes are disposed at the points of a triangle.

8. An apparatus as in claim 4, wherein said axes are disposed at the points of a polygon.

9. An apparatus for purifying crystals as in claim 4, wherein said axes are adapted to rotate in the same or opposite directions with respect to each other.

10. A stirrer-equipped apparatus for purifying a crystalline substance containing impurities having a lower melting point than that of the final product consisting of:

a. a purification tower,
 b. means at the lower portion of said purification tower for charging impurity-containing crystals into said tower,
 c. heating means at the upper portion of the tower for melting at least a portion of the resulting purified crystals,
 d. means for returning at least a portion of the melted purified crystals to the upper portion of the inside of said tower,
 e. means for withdrawing that portion of the molten purified crystals not returned to the inside of said tower out of said tower, and
 f. stirrer means for transporting said impurity-containing crystals upwards from the lower portion of said tower to the upper portion of said tower, said stirrer means comprising a centrally located rotatable axis having a plurality of fins, secured to and projecting outwardly from said axis, said fins being arranged along said axis forming a discontinuous spiral around said axis, each of said fins being pitched at an angle opposite to the direction of the sprial, wherein the upper portion of each fin overlaps the lower portion of the next vertically adjacent fin proceeding upwardly in the direction of the sprial, said stirrer being provided with heating means within said axis and each of said fins in order to prevent the deposition of said impurity-containing crystals on said axis or fins.

* * * * *